Figure 1:
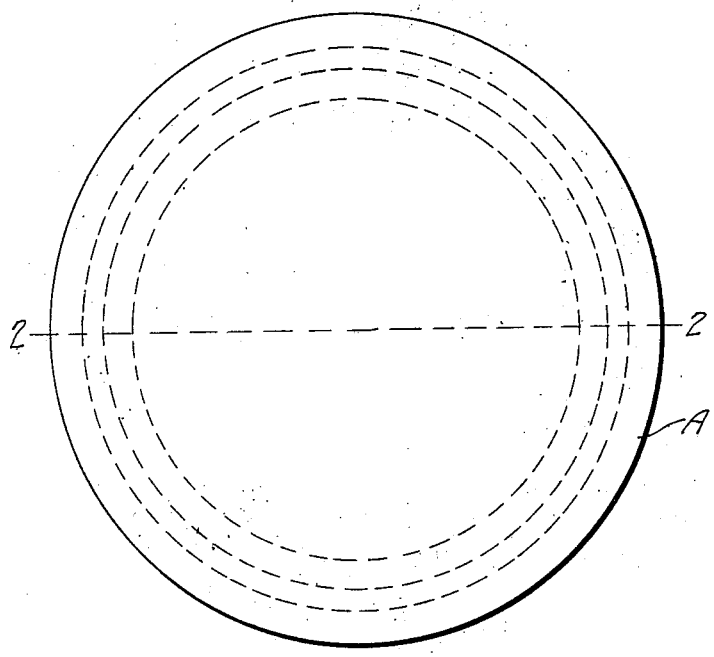

H. C. ADAM.
HEATING DEVICE FOR FIRELESS COOKERS.
APPLICATION FILED MAR. 30, 1920.

1,370,722.

Patented Mar. 8, 1921.

INVENTOR
Harry C. Adam.
BY
Bakewell & Church
ATTORNEY

UNITED STATES PATENT OFFICE.

HARRY C. ADAM, OF ST. LOUIS, MISSOURI.

HEATING DEVICE FOR FIRELESS COOKERS.

1,370,722.  Specification of Letters Patent.  Patented Mar. 8, 1921.

Application filed March 30, 1920. Serial No. 370,057.

*To all whom it may concern:*

Be it known that I, HARRY C. ADAM, a citizen of the United States, residing at St. Louis, Missouri, have invented a certain new and useful Improvement in Heating Devices for Fireless Cookers, of which the following is a full, clear, and exact description, such as will enable others skilled in the art to which it appertains to make and use the same.

This invention relates to heating devices of the kind that are adapted to be heated in a fire or over a gas flame and then arranged in contact with an object or article which it is desired to heat.

One kind of heating device of the general type referred to that has been used in fireless cookers for heating the receptacle that contains the food consists of a cast iron member, usually of disk form, which, after being heated to a high degree, is placed inside of the fireless cooker underneath the food receptacle. If the device is heated to a sufficiently high temperature to store up enough heat in same to insure a supply of heat to the food receptacle for a relatively long period, or, in other words, for a sufficient time to complete the cooking operation, there is great liability of too much heat being supplied to the food receptacle when said receptacle is first placed on the device, on account of the extremely high temperature of the device. In fact, heating devices of the kind referred to frequently cause the food to boil over when the food receptacle is first placed on the heating device arranged inside of the cooker.

The main object of my invention is to overcome the objectionable feature or characteristic above mentioned of metallic heating devices of the kind that are now extensively used in fireless cookers. While my improved heating device is intended primarily for use in fireless cookers, it is not limited to such use, but is capable of use for various other purposes where it is desired to heat an article or object by radiated heat from a device in which heat is stored.

Accordingly, I have devised a heating device which consists of a member formed of material that is capable of absorbing heat, and thereafter radiating the heat stored in same, and means that tends to prevent the stored heat from radiating rapidly through the portion of said member that is arranged in contact with or in proximity to the article or object to be heated. My improved device preferably consists of a cast iron member of any preferred shape and size, and a medium embedded in said member that tends to prevent heat stored in one portion of said member from radiating rapidly to the portion of said member that is arranged in contact with or in proximity to the article which is being heated.

Figure 2:
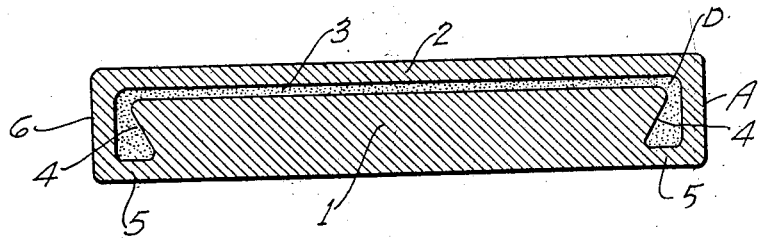

Figure 1 of the drawings is a top plan view of a heating device constructed in accordance with my invention; and Fig. 2 is a vertical transverse sectional view of said device, taken on the line 2—2 of Fig. 1.

Referring to the drawings which illustrate the preferred form of my invention, A designates a member preferably formed of cast metal and having a chamber inside of same that contains a medium B which tends to prevent the heat stored in said member from escaping or radiating rapidly through the portion of said member that is arranged in contact with the article being heated, it being understood that the member A is placed over a fire or over a flame so as to store up heat in same, and thereafter arranged in contact with the article that is to be heated. The member A herein illustrated is of disk form and the medium B in same that tends to prevent the rapid radiation of the stored heat consists of a sand core that is embedded in the member A during the process of casting same. The particular shape and size of the sand core B are immaterial, but I prefer to use a sand core of such shape and dimensions that the member A will be provided on one side with a relatively thick portion 1 and on its opposite side with a relatively thin portion 2, as shown in Fig. 2. When the member A is being heated the underside of same comprising the relatively thick portion 1 is placed over a fire, usually over a gas flame, and maintained in contact with the flame until sufficient heat has been stored up in the member A to insure proper heating of the article to which the member A is thereafter applied. Said article is then arranged in contact with the upper side or relatively thin portion 2 of the member A, so as to cause said article to be heated by the heat which radiates from the top portion of the member A.

I do not wish it to be understood that the sand core B serves as an insulator to prevent the heat stored in the thick portion 1 of the member A from radiating to the thin portion 2 of said member through which the heat is transmitted to the article being heated, for such is not the case. On the contrary, the sand core B transmits heat from the bottom portion 1 of the member A to the top portion 2, but it prevents said top portion from becoming heated to as high a degree of temperature as the bottom portion 1 of said member. Accordingly, the member A can be heated over a fire for a long enough period to store up sufficient heat in same to insure proper heating of the object or article with which the device is used without liability of supplying too much heat to the article when the device is first arranged in contact with same. Accordingly, such a heating device can be used successfully in a fireless cooker without danger of the food boiling over when the food receptacle is first arranged in contact with the device.

As previously stated, the form of the member A and of the element B is immaterial, so far as my broad idea is concerned, but when the member A is made in the form of a cast iron disk, I prefer to use a sand core B that has a relatively thin, disk-shaped portion 3 provided at its peripheral edge with a depending undercut flange 4 so as to cause the thick portion 1 of the member A to taper gradually from the upper side of said portion 1 to the point where it is joined to the horizontal web 5 that connects the thick portion 1 to the annular outer wall 6 of the member A which surrounds the core B, thus permitting the portion 1 to which the heat is applied and which is heated to a relatively high temperature to expand and contract without liability of breaking the casting.

Having thus described my invention, what I claim as new and desire to secure by Letters Patent is:

1. A heating device, consisting of a member having a relatively thick portion that is adapted to have heat applied to same and a relatively thin portion that is adapted to be arranged in contact with or in proximity to an article to be heated, and means arranged between said thick and thin portions for preventing heat from radiating rapidly to the thin portion of said member.

2. A heating device, consisting of a cast iron member provided with an inclosed chamber that contains a sand core, said core being of such shape that said member is provided with a relatively thin heat radiating portion and a relatively thick heat storing portion that is capable of expanding and contracting without breaking the casting.

3. A heating device, consisting of a disk-shaped member formed of cast iron, and a sand core arranged inside of said member and so formed that portions of said member lying on opposite sides of said core are of different thicknesses.

4. A heating device, consisting of a disk-shaped member formed of cast iron, a sand core embedded in said member and provided with a disk-shaped portion arranged parallel to the top and bottom faces of said member, and a depending undercut flange arranged at the peripheral edge of said disk-shaped portion.

HARRY C. ADAM.